US005747906A

United States Patent [19]

Tajima et al.

[11] Patent Number: 5,747,906

[45] Date of Patent: May 5, 1998

[54] ELECTROACOUSTIC TRANSDUCER

[75] Inventors: Kazushige Tajima; Yoshio Imahori, both of Shizuoka, Japan

[73] Assignee: Star Micronics Co., Ltd., Shizuoka, Japan

[21] Appl. No.: 746,719

[22] Filed: Nov. 15, 1996

[30] Foreign Application Priority Data

Nov. 17, 1995 [JP] Japan .................................... 7-323693

[51] Int. Cl.$^6$ ........................................ H02K 5/00

[52] U.S. Cl. ............................ 310/89; 310/324; 310/322; 310/332; 310/334; 367/158

[58] Field of Search .............................. 310/89, 324, 322, 310/332, 334; 367/158, 157, 152; 336/192

[56] References Cited

U.S. PATENT DOCUMENTS 4,006,447 2/1977 Narbaits-Jaureguy et al. .......... 340/33
4,555,797 11/1985 Nieuwendijk et al. ................ 381/117
4,777,461 10/1988 Sakamoto ................................ 333/184
5,254,871 10/1993 Benavides et al. ..................... 257/666
5,467,323 11/1995 Sone ....................................... 367/175
5,530,426 6/1996 Wilk ........................................ 340/531

*Primary Examiner*—Steven L. Stephan
*Assistant Examiner*—Timothy A. Williams
*Attorney, Agent, or Firm*—Sughrue, Mion, Zinn, Macpeak & Seas, PLLC

[57] ABSTRACT

An electroacoustic transducer, which has a lead frame previously formed into a predetermined shape, an outer case formed integrally with the lead frame and a drive section including a coil arranged inside the outer case, comprises an opening formed in the outer case; lands formed by exposing a part of the lead frame through an outer surface of the outer case; and the coil having coil terminals led out of the outer case through the opening and connected to the lands.

13 Claims, 9 Drawing Sheets

ELECTROACOUSTIC TRANSDUCER

BACKGROUND OF THE INVENTION

1. Field of the Invention

The present invention relates to an electroacoustic transducer, and, more particularly, to an electroacoustic transducer, which has an outer case formed integral with a lead frame previously formed into a predetermined shape and has some improvement on the structure of the terminal disposal section of a coil, thereby contributing to the reduction of the number of required parts, the simplification of the structure, the reduction of the size, and improvements on its performance and assembly efficiency.

2. Description of the Related Art

A variety of electroacoustic transducers include various types of electromagnetic type electroacoustic transducers. An electromagnetic type electroacoustic transducer as the first prior art is illustrated in FIGS. 11 and 12. There are an upper case 501 and a lower case 503, with a circular sound port 505 formed in the center of the top face of the upper case 501 in FIG. 11. A base 507, a printed circuit board 509 and a core 511 are accommodated in the lower case 503 in a securely integrated manner. A pair of pin-like lead terminals 513 and 515 are securely attached to the printed circuit board 509, and are led out of the board 509 downward in FIG. 11 by predetermined lengths.

A coil 517 is wound around the core 511, and a magnet 519 is placed around the coil 517 with a ring-like clearance formed in between. Formed at the upper end portion of the lower case 503 is a step portion 521 at which a diaphragm 522 is provided. This diaphragm 522 comprises an elastic plate (also called a resonance plate) 523 and a magnetic piece 525 attached as an added mass to the center portion of this elastic plate 523 on the upper case side.

In the thus constituted electromagnetic type electroacoustic transducer, the elastic plate 523 integrally provided with the magnetic piece 525 is set to have a given polarity by the magnet 519. When a current flows across the coil 517 via the lead terminals 513 and 515 under this situation, the core 511 is magnetized, generating a magnetic field at the distal end. When the magnetic pole of the core 511 induced by the coil 517 is the same as the magnetic pole induced by the magnet 519 attached to the elastic plate 523, the elastic plate 523 repels the core 511. When the former magnetic pole of the core 511 is different from the latter magnetic pole induced by the magnet 519, the elastic plate 523 is attracted to the core 511. By allowing the current to intermittently flow in either direction, therefore, the elastic plate 523 repeats the above-described operation. In other words, the elastic plate 523 vibrates at a given frequency, thus generating a sound.

This electromagnetic type electroacoustic transducer has a terminal connection structure of a coil as will be discussed below. As shown in FIG. 12, both coil terminals **517*a* and 517*b* of the coil 517 are led out on the printed circuit board 509 via an opening 507*a* formed in the base 507, and are securely soldered to lands 509*a* and 509*b* provided on the printed circuit board 509**.

Positioning projections 527 and 529 protruding from the base 507 in FIG. 12 serve to position the printed circuit board 509 with respect to the base 507. This electromagnetic type electroacoustic transducer having the above-described structure is attached to a mounting board 531 indicated by an alternate one long and two short dashes line in FIG. 11 (which may be the mounting board of a portable telephone, a pager or the like if this electroacoustic transducer is incorporated into such a unit).

An electromagnetic type electroacoustic transducer as the second prior art will be discussed below with reference to FIGS. 13 and 14. A case 601 has a base member 603 attached to the bottom. A base 605 and a core 607 are integrally secured inside the base member 603. A coil 609 is wound around the core 607. A support ring 611 is provided inside the base member 603, and a magnet 613 is provided on the inner wall of this support ring 611. A ring-like clearance is formed between the magnet 613 and the coil 609. Formed at the left-hand end portion of the support ring 611 in FIG. 14 is a step portion 615 at which a diaphragm 616 is provided. This diaphragm 616 comprises an elastic plate (also called a resonance plate) 617 and a magnetic piece 619 attached as an added mass to the center portion of this elastic plate 617.

In the thus constituted electromagnetic type electroacoustic transducer, external connection terminals 621 and 623 have previously been attached in an integral manner to the base member 603 by insertion. In this case, as shown in FIG. 13, both coil terminals **609*a* and 609*b* of the coil 609 are led out on lands 621*a* and 623*a* (located in the base member 603) of the external connection terminals 621 and 623** and are securely soldered to those lands.

Since the action of this electromagnetic type electroacoustic transducer is the same as that of the electromagnetic type electroacoustic transducer illustrated in FIGS. 11 and 12, its description will not be repeated. The incorporation of this electromagnetic type electroacoustic transducer in a portable telephone, a pager or the like is the same as that of the first prior art; reference numeral "625" is given to the mounting board used for the incorporation as indicated by an alternate one long and two short dashes line in FIG. 14. In this case, the electroacoustic transducer is soldered at four places, namely the aforementioned external connection terminals 621 and 623 and attachment terminals 627 and 629 (shown in FIG. 13) which do not function electrically.

An electromagnetic type electroacoustic transducer as the third prior art will now be discussed with reference to FIG. 15. A case 701 has a circular sound port 703 formed in the center of the top face of the case 701 in FIG. 15. A base 705, a bobbin 707 and a core 709 are accommodated in the case 701 in a securely integrated manner. A pair of pin-like lead terminals 711 and 713 are attached to the bobbin 707, and are led through and out of the base 705 downward in FIG. 15 by predetermined lengths. A coil 715 is wound around the bobbin 707. A plastic magnet 717 is placed inside the case 701 with a ring-like clearance formed between the plastic magnet 717 and the coil 715.

Formed at the plastic magnet 717 is a step portion 719 at which a diaphragm 720 is provided. This diaphragm 720 comprises an elastic plate (also called a resonance plate) 721 and a magnetic piece 723 attached as an added mass to the center portion of this elastic plate 721 on the upper case side. In this case, both coil terminals **715*a* and 715*b* are led out toward the lead terminals 711 and 713**, bound on them and secured by solder.

Since the action of this electromagnetic type electroacoustic transducer is the same as those of the electromagnetic type electroacoustic transducer illustrated in FIGS. 11 and 12 and the electromagnetic type electroacoustic transducer illustrated in FIGS. 13 and 14, its description will not be repeated. The incorporation of this electromagnetic type electroacoustic transducer in a portable telephone, a pager or the like is the same as that of the first prior art; reference numeral "725" is given to the mounting board used for the incorporation as indicated by an alternate one long and two short dashes line in FIG. 15.

The electroacoustic transducers according to the prior art have complicated structures and/or are large, which requires a greater number of parts and involves complicated assembling.

Those shortcomings will be discussed specifically. With regard to the electromagnetic type electroacoustic transducer according to the first prior art shown in FIGS. 11 and 12, both coil terminals 517*a* and 517*b* of the coil 517 are securely soldered to the lands 509*a* and 509*b* of the printed circuit board 509, and electrical inputs are made to the electroacoustic transducer via the pair of lead terminals 513 and 515 attached to the printed circuit board 509. This electroacoustic transducer therefore includes a greater number of components and requires a complicated structure at least in that it requires the printed circuit board 509.

As regards the electromagnetic type electroacoustic transducer according to the second prior art shown in FIGS. 13 and 14, the external connection terminals 621 and 623 are provided on a side portion of the drive section (which is constituted by the core 607, coil 609, magnet 613, elastic plate 617, magnetic piece 619, etc.) and both coil terminals 609*a* and 609*b* of the coil 609 are led out in the side portion of the drive section to be securely soldered to the lands 621*a* and 623*a* of the external connection terminals 621 and 623. This electroacoustic transducer needs planar space on the side portion of the drive section and thus becomes large. Moreover, at the time the coil terminals 609*a* and 609*b* are securely soldered to the lands 621*a* and 623*a* of the external connection terminals 621 and 623, the various components in the vicinity of the soldering portion interfere with the soldering work, thus deteriorating the workability.

The electromagnetic type electroacoustic transducer according to the third prior art shown in FIG. 15 is a bobbin type which essentially uses the bobbin 707. This inevitably increases the number of required components, complicates the structure and increases the overall size.

In consideration of the recent demands for smaller devices of various kinds which incorporate an electromagnetic type electroacoustic transducer, such as portable telephones and pagers, there are strong demands for smaller electromagnetic type electroacoustic transducers with simpler structures.

SUMMARY OF THE INVENTION

Accordingly, it is an object of the present invention to provide an electroacoustic transducer which has an outer case formed integrally with a lead frame previously formed into a predetermined shape and has some improvement on the structure of the terminal disposal section of a coil, thereby contributing to the reduction of the number of required parts, the simplification of the structure, the reduction of the size, and improvements on its performance and assembly efficiency.

To achieve the above object, according to this invention, an electroacoustic transducer, which has a lead frame previously formed into a predetermined shape, an outer case formed integrally with the lead frame and a drive section including a coil arranged inside the outer case, comprises an opening formed in the outer case; lands formed by exposing a part of the lead frame on an outer surface of the outer case; and the coil having coil terminals led out of the outer case through the opening and connected to the lands.

This electroacoustic transducer is designed on the premise that the outer case is formed integrally with the lead frame previously formed into a predetermined shape, and has the opening formed in the outer case and a part of the lead frame exposed as a pair of lands on the outer surface of the outer case, whereby the coil terminals of the coil are led out of the outer case through the opening and securely attached to the lands. Unlike the prior art, therefore, this invention can provide the desired structure of the terminal disposal section of a coil without requiring a printed circuit board or a bobbin and without requiring large planar space.

In the electroacoustic transducer, the opening may be formed in a bottom of the outer case and a part of the lands may be exposed on the bottom of the outer case.

Alternatively, the opening may be formed in a side wall of the outer case and the lands may be exposed on the side wall of the outer case.

In either case, a groove may be formed in the outer case and the opening and the lands may be formed and located in the groove.

In the case where the groove is formed in the outer case and the opening and the lands are formed and located in the groove, the terminal disposal section of the coil formed on the lands and the coil lying between the opening and the terminal disposal section of the coil do not protrude from the outer wall of the outer case, and the coil terminals are automatically positioned by the groove.

This electroacoustic transducer may further comprise a plurality of external connection terminals formed by exposing a part of the lead frame on a side wall of the outer case, wherein the opening and the lands are located on the same side wall as the external connection terminals.

This electroacoustic transducer may further comprise a plurality of external connection terminals formed by exposing a part of the lead frame on a side wall of the outer case, wherein the opening and the lands are located on another side wall where the external connection terminals are not located.

The electroacoustic transducer may be an electromagnetic type, an electric conduction type, or a piezo type.

According to the electroacoustic transducer embodying this invention, whose outer case is formed integrally with a lead frame previously formed into a predetermined shape, an opening is formed in the outer case, a part of the lead frame is exposed as a pair of lands on the outer surface of the outer case, the coil terminals of the coil are led out of the outer case through the opening to be securely attached to the lands. Unlike the prior art, therefore, this invention needs neither a printed circuit board nor a bobbin at the time of connecting the terminal, thus allowing the number of required parts and the overall size to be reduced, ensuring a simpler structure and facilitating the assembling work.

When a groove is formed in the outer case and the opening and the lands are formed and located in the groove, the terminal disposal section of the coil formed on the lands and the coil lying between the opening and the terminal disposal section of the coil do not protrude from the outer wall of the outer case. Even if the surface of the outer case on which the opening and the lands are formed faces the mounting board of an external unit, such as a portable telephone or a pager, in which the electroacoustic transducer is to be installed, it is unnecessary to provide the mounting board with some means to retain portions protruding from the electroacoustic transducer. Further, as the coil lying between the opening and the terminal disposal section of the coil do not protrude from the outer wall of the outer case, it is possible to prevent the accidental disconnection of the coil. This can ensure the reliability of the product. As the coil terminals are automatically positioned by the groove, no separate positioning means is necessary and the positioning of the coil terminals onto the lands can be accomplished easily and reliably.

DETAILED DESCRIPTION OF THE PREFERRED EMBODIMENTS

First Embodiment

Figure 2:
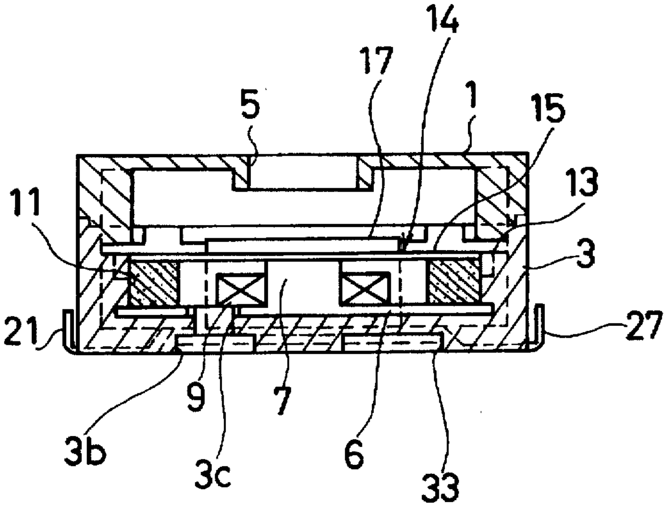
FIG. 2 is a cross-sectional view of the first embodiment taken along the line II—II in FIG. 1.
Figure 3:
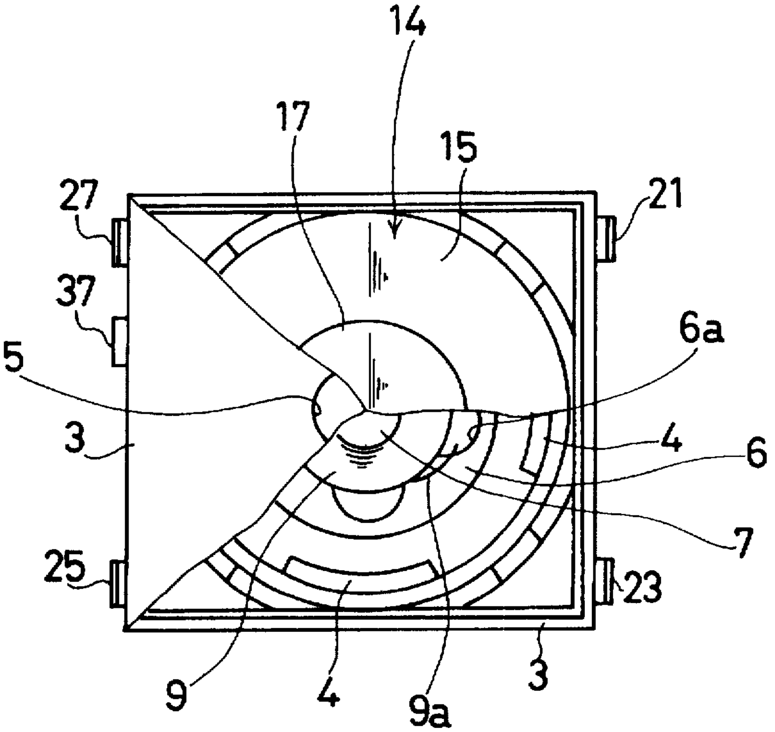
FIG. 3 is a plan view showing an elastic plate and a magnetic piece with a part of the upper case cut away, and showing a coil with parts of the elastic plate and magnetic piece cut away.
Figure 4:
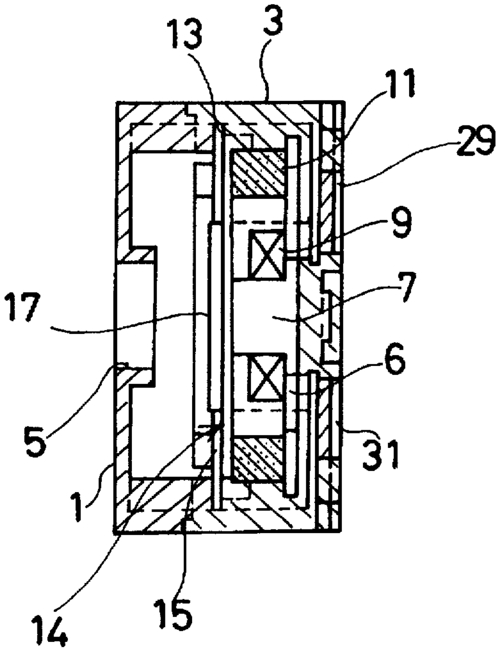
FIG. 4 is a cross-sectional view of the first embodiment taken along the line IV—IV in FIG. 1.

The first embodiment of the present invention will now be described with reference to FIGS. 1 through 7. To begin with, the structure of an electromagnetic type electroacoustic transducer according to this embodiment will be discussed referring to FIGS. 1 to 4. As shown in FIGS. 2 and 3, there are an upper case 1 and a lower case 3, with a circular sound port 5 formed in the center of the top face of the upper case 1 in FIG. 2. A base 6 and a core 7 are arranged at the center portion in the lower case 3 in a securely integrated manner, and a coil 9 is wound around the core 7. A magnet 11 is placed around the coil 9 at the inner wall of the lower case 3. As shown in FIG. 3, the magnet 11 is supported at its outer periphery by four support portions 4 (see FIG. 3) protrusively provided on the inner wall of the lower case 3. Formed on the inner wall of the lower case 3 is a step portion 13 at which a diaphragm 14 is provided, as shown in FIGS. 2 and 3. This diaphragm 14 comprises an elastic plate (also called a resonance plate) 15 and a magnetic piece 17 attached as an added mass to the center portion of this elastic plate 15.

FIG. 3 is a plan view showing the elastic plate 15 and the magnetic piece 17 with a part of the upper case 1 cut away, and showing the coil 9 with parts of the elastic plate 15 and magnetic piece 17 cut away.

Figure 1:
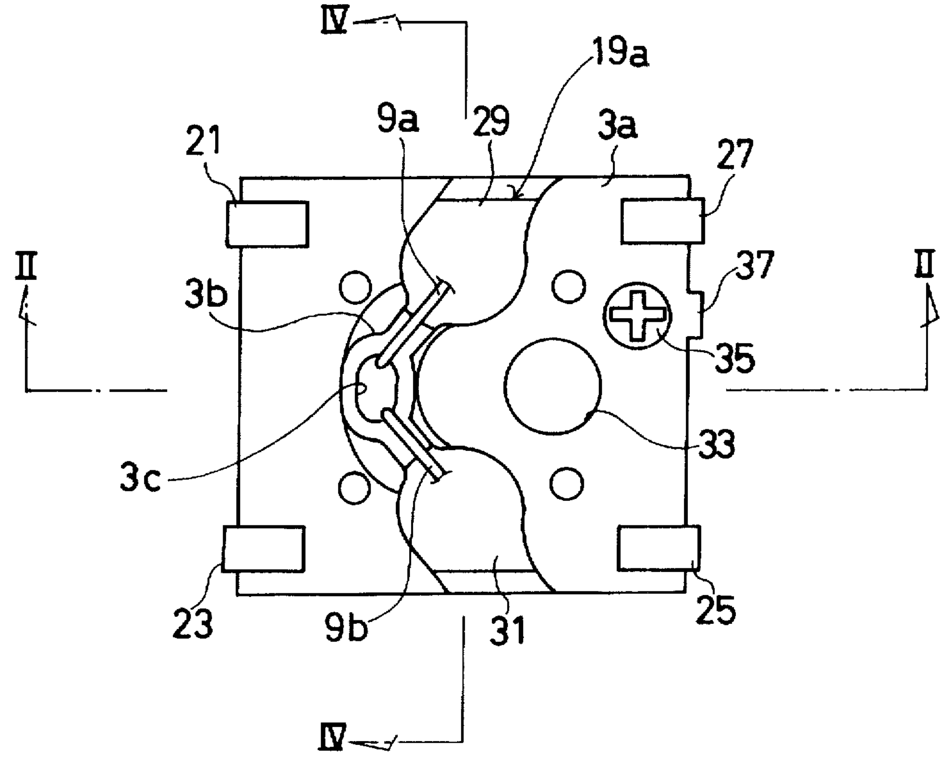
FIG. 1 is a plan view of an electromagnetic type electroacoustic transducer according to the first embodiment of this invention as viewed from the bottom side of its lower case.

The lower case 3 has the bottom structure as shown in FIG. 1 as seen from the bottom side. The lower case 3 has a bottom wall *3a* in which a groove *3b* is formed. An opening *3c* is formed in the center portion of this groove *3b*.

An opening *6a* (shown in FIG. 3) is likewise formed in the base 6 located on the inner side of the bottom wall *3a*, and the opening *3c* is formed at the position matching with the opening *6a*.

Figure 5:
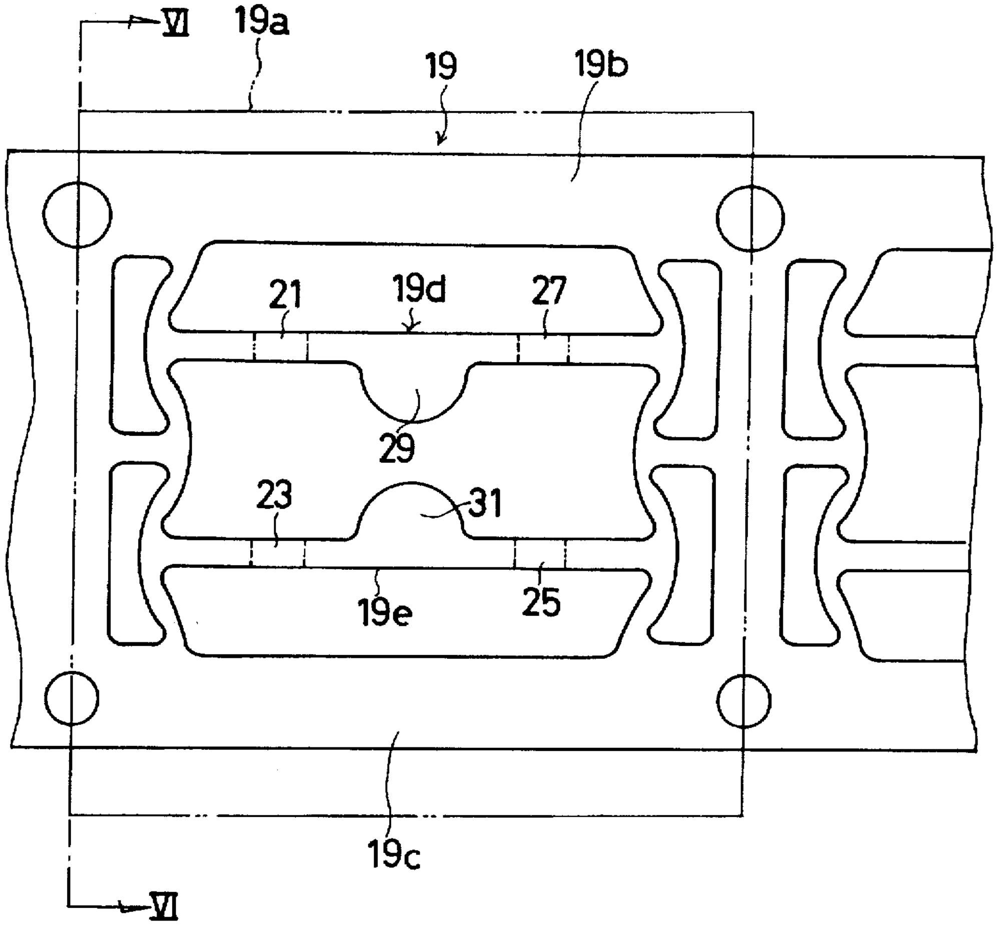
FIG. 5 is a plan view depicting a part of a lead frame according to the first embodiment.

The groove *3b* obliquely extends nearly symmetrically in the up-and-down direction with the opening *3c* at the center in FIG. 1. A part of a lead frame element *19a* of a lead frame 19 shown in FIG. 5 is integrally buried in the bottom wall *3a* by insertion. The four corner portions of the lead frame element *19a* are exposed on the lower case 3 as external connection terminals 21, 23, 25 and 27. Some other parts of the lead frame element *19a* are exposed in the groove *3b* as lands 29 and 31.

Both coil terminals *9a* and *9b* of the coil 9 accommodated in the lower case 3 are led out to the outer side of the bottom wall *3a* of the lower case 3 through the opening *6a* of the base 6 and the opening *3c* of the lower case 3. Those coil terminals *9a* and *9b* are placed along the lands 29 and 31 respectively and are securely soldered there.

Figure 6:
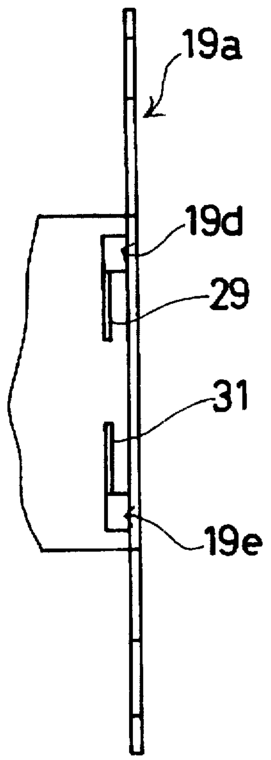
FIG. 6 is a cross-sectional view of the first embodiment taken along the line VI—VI in FIG. 5.

The lead frame 19 will now be discussed specifically. The lead frame 19 has a shape as shown in FIGS. 5 and 6. The lead frame 19 has an arbitrary number of lead frame elements *19a* (surrounded by an alternate one long and two short dashes line in FIG. 5) coupled side by side, each associated with a single electromagnetic type electroacoustic transducer. The number of lead frame elements *19a* serially connected is four, six, eight, or the like, for example, and the same number of electromagnetic type electroacoustic transducers are to be manufactured at the same time. The lead frame element *19a* has wide portions *19b* and *19c* located at the top and bottom in FIG. 5 and extending horizontally, and a pair of bridge portions *19d* and *19e* provided between the wide portions *19b* and *19c*. Portions which become the aforementioned external connection terminals 21, 23, 25 and 27 and portions which become the aforementioned lands 29 and 31 are provided on the bridge portions *19d* and *19e*.

Figure 7:
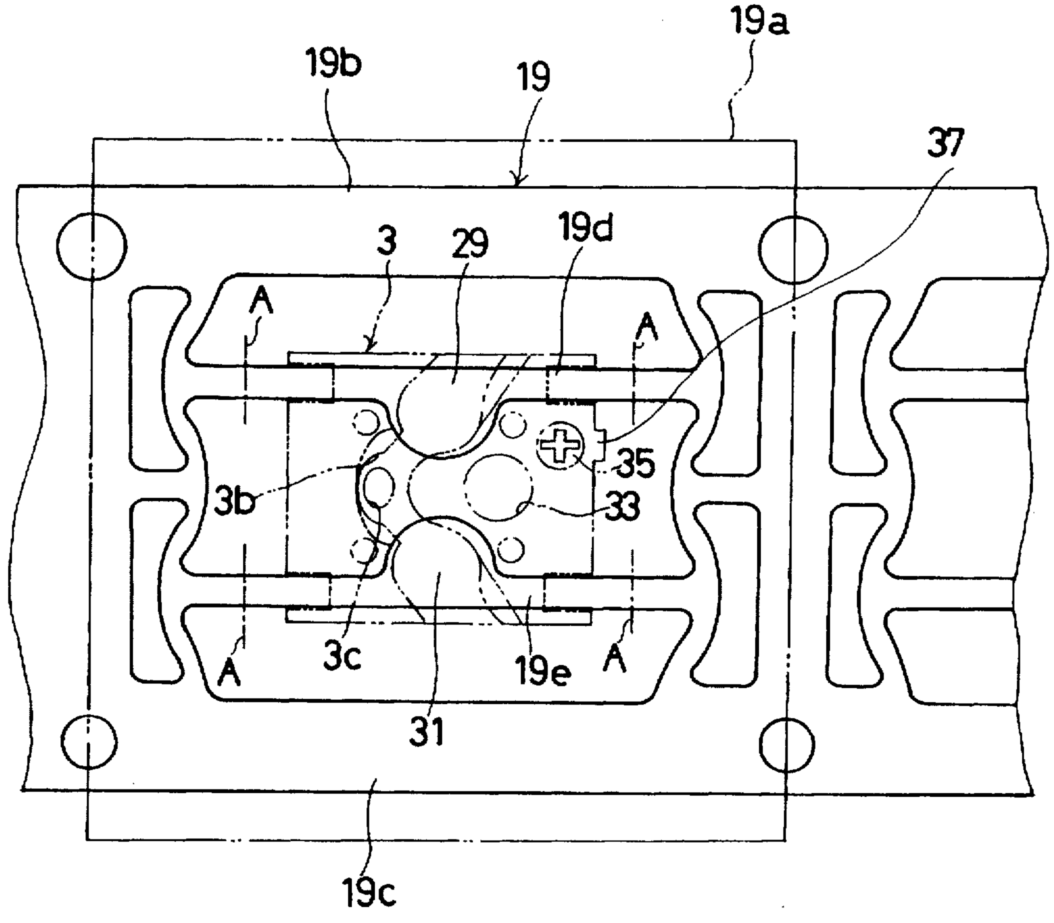
FIG. 7 is a plan view illustrating a lower case formed integrally with a part of the lead frame by inserting in the first embodiment.

With the thus constituted lead frame 19 placed along a mold (not shown), a resin is filled in the mold, yielding the lead frame 19 integrated with the lower case 3. This is the integration method. FIG. 7 shows how this integration is carried out. The lower case 3 indicated by an alternate one long and two short dashes line in FIG. 7 is formed integral with the lead frame 19. Thereafter, the bridge portions *19d* and *19e* are cut along a cut line A shown in FIG. 7 and the external connection terminals 21, 23, 25 and 27 are bent toward the upper case 1, providing the state shown in FIG. 1.

In FIGS. 1, 2 and 7, reference numeral "33" indicates the insert hole for letting the resin flow at the time of integration. In FIG. 1 and 7, reference numeral "35" denotes a mark indicating the polarity, and reference numeral "37" is a projection indicating the direction.

This embodiment has the following advantages.

This embodiment, unlike the prior art, requires neither a printed circuit board nor a bobbin at the terminal disposal section of a coil, thus allowing the number of required parts to be reduced to simplify the structure. Accordingly, the assembly efficiency can be improved and the electroacoustic transducer can be designed to be more compact.

As the terminal disposal section of a coil is located at the back of the drive section, the planar space can be reduced to reduce the planar size. As the terminal disposal section of a coil is located at the back of the drive section, there is no obstruction which interferes with the work of soldering the coil terminal, thus improving the workability and the quality of the coil terminal disposal section.

Those advantages are particularly effective for a surface mounting type of an electromagnetic type electroacoustic transducer.

As the groove 3*b* is formed in the lower case 3 and the opening 3*c* and the lands 29 and 31 are formed and located in the groove 3*b*, the coil terminal disposal section formed on the lands 29 and 31 and both coil terminals 9*a* and 9*b* lying between the opening 3*c* and the coil terminal disposal section do not protrude from the outer wall of the lower case 3. Even if the surface of the lower case 3 on which the opening 3*c* and the lands 29 and 31 are formed faces the mounting board of an external unit, such as a portable telephone or a pager, in which the electroacoustic transducer is to be installed, it is unnecessary to provide the mounting board with some means to retain portions protruding from the electroacoustic transducer. Further, it is possible to prevent the disconnection of the coil 9 from being caused by accidental hooking of the coil terminals 9*a* and 9*b*, lying between the opening 3*c* and the coil terminal disposal section, on something. This can ensure the reliability of the product. As both coil terminals 9*a* and 9*b* are automatically positioned by the groove 3*b*, requiring no separate positioning means, the positioning of the coil terminals 9*a* and 9*b* to the lands 29 and 31 can be accomplished easily and reliably.

Second Embodiment

Figure 8:
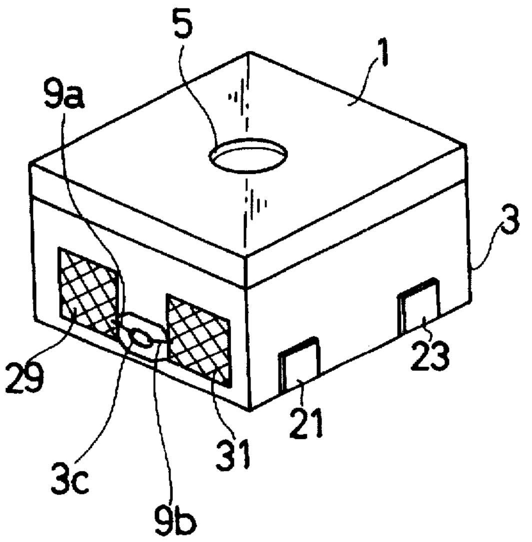
FIG. 8 is a perspective view of an electromagnetic type electroacoustic transducer according to the second embodiment of this invention.

Referring to FIG. 8, the second embodiment of this invention will be described below. Although the terminal disposal section of a coil is located at the back of the lower case 3 in the first embodiment, the position is not particularly limited to this location. In the second embodiment, the opening 3*c* is formed in one side wall of the lower case 3 and a pair of lands 29 and 31 of the lead frame element 19*a* are exposed with the opening 3*c* in between.

Third Embodiment

Figure 9:
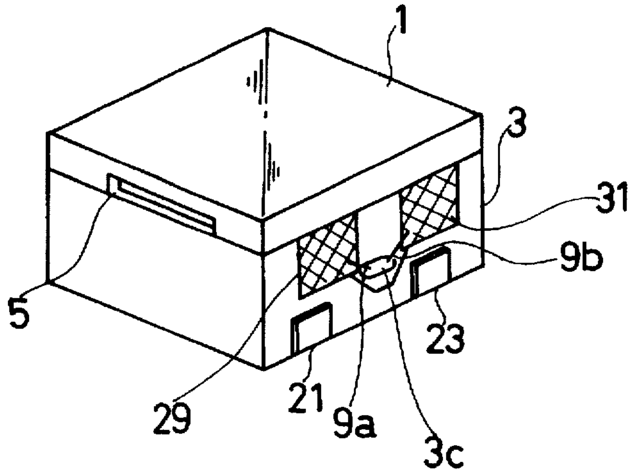
FIG. 9 is a perspective view of an electromagnetic type electroacoustic transducer according to the third embodiment of this invention.

Referring to FIG. 9, the third embodiment of this invention will be discussed below. In this embodiment, the sound port 5 is formed in one side wall of the upper case 1, and the opening 3*c* is formed in one side wall of the lower case 3 where the exposed terminals 21 and 23 are exposed, with the lands 29 and 31 also exposed on the same side wall.

Fourth Embodiment

Figure 10:
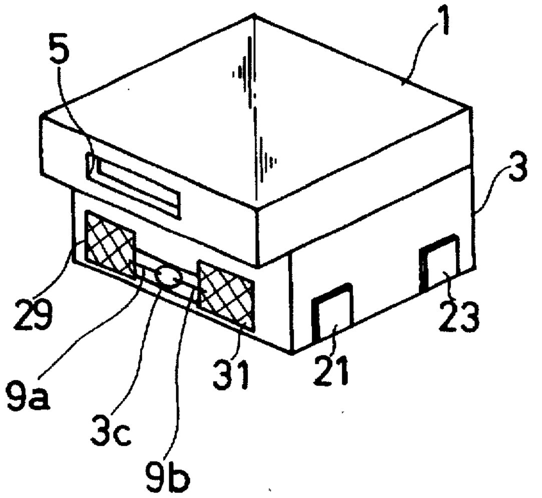
FIG. 10 is a perspective view of an electromagnetic type electroacoustic transducer according to the fourth embodiment of this invention.
Figure 11:
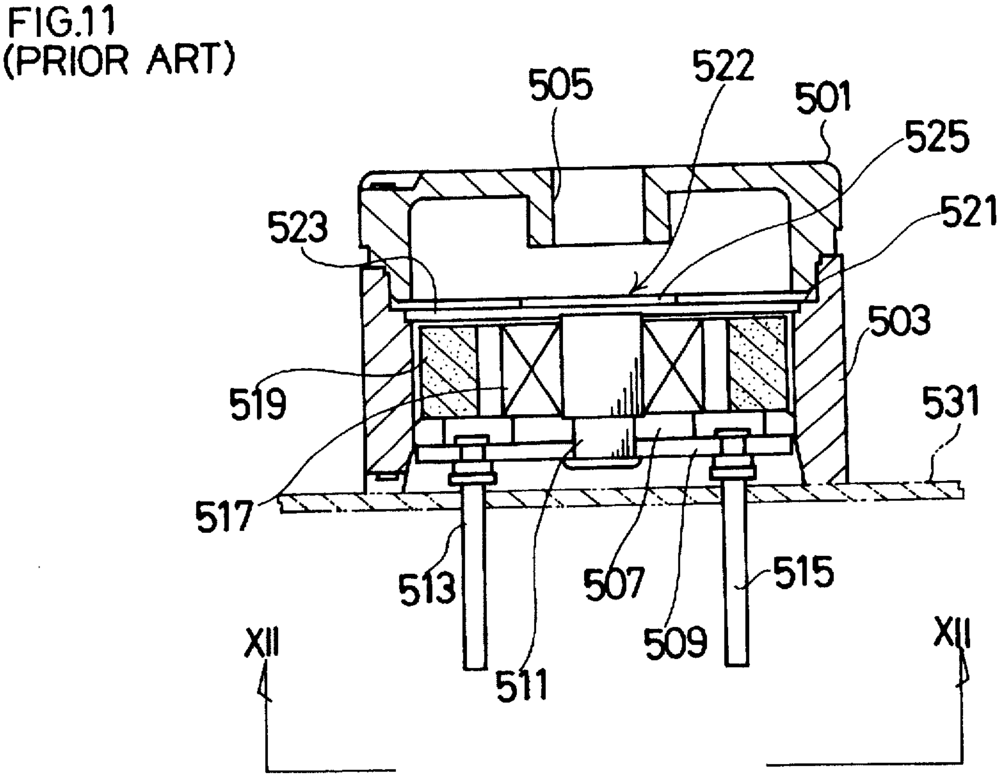
FIG.11 (PRIOR ART)
FIG. 11 is a cross-sectional view of an electromagnetic type electroacoustic transducer according to the first prior art.
Figure 12:
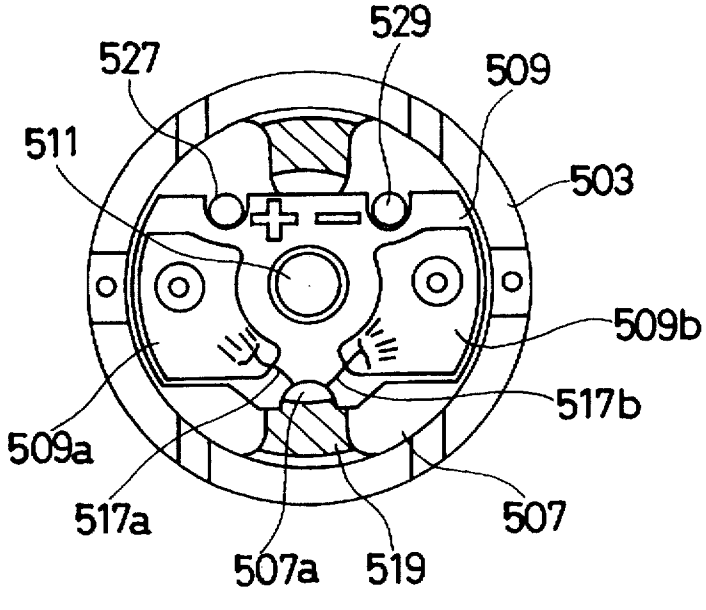
FIG.12 (PRIOR ART)
FIG. 12 is a diagram of the first prior art as viewed from XII—XII in FIG. 11.
Figure 13:
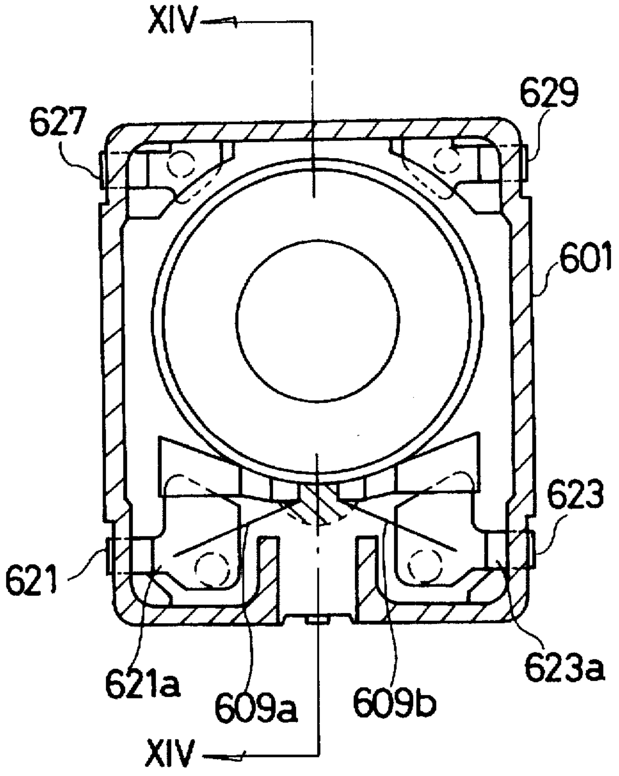
FIG.13 (PRIOR ART)
FIG. 13 is a cross-sectional view of an electromagnetic type electroacoustic transducer according to the second prior art.
Figure 14:
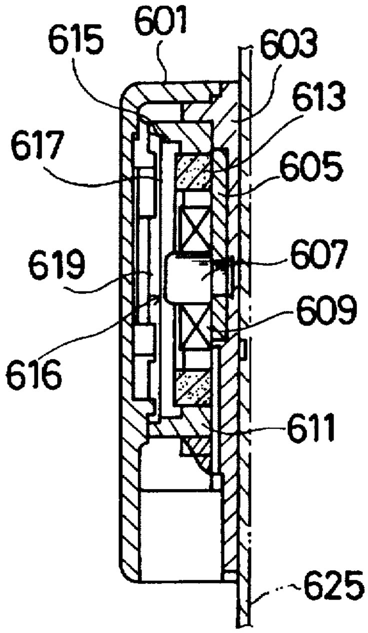
FIG.14 (PRIOR ART)
FIG. 14 is a cross-sectional view of the second prior art along the line XIV—XIV in FIG. 13.
Figure 15:
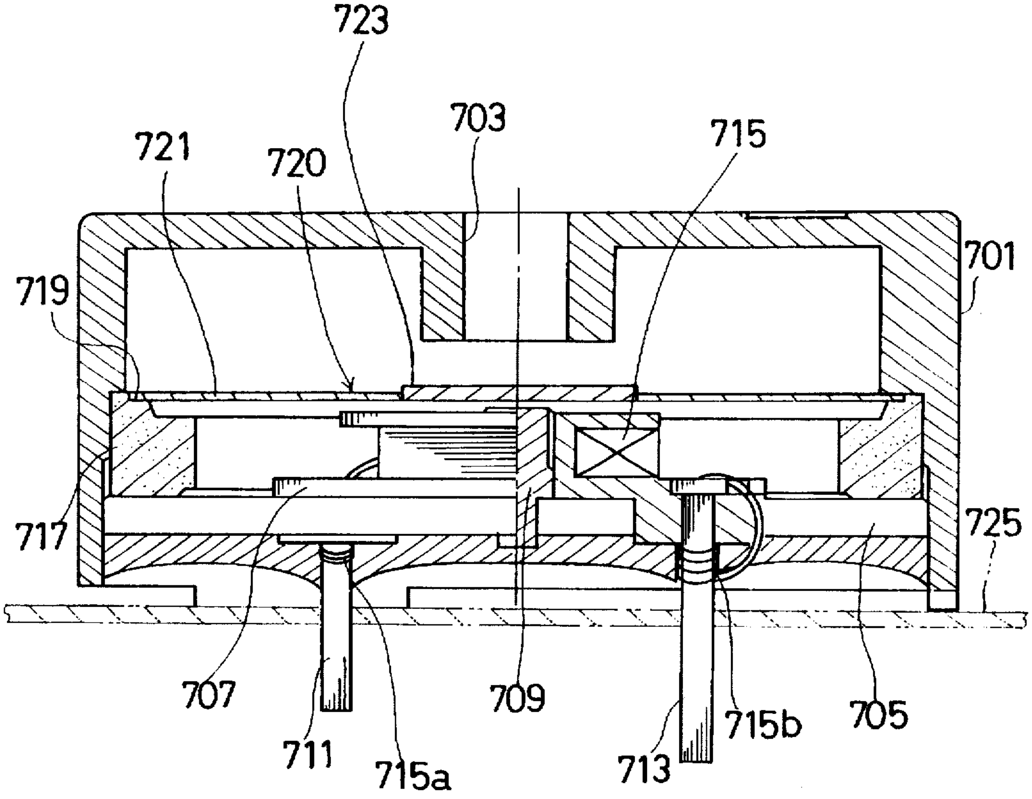
FIG.15 (PRIOR ART)
FIG. 15 is a cross-sectional view of an electromagnetic type electroacoustic transducer according to the third prior art.

Referring to FIG. 10, the fourth embodiment of this invention will now be described. In this embodiment, one side of the upper case 1 is formed to extend over the lower case 3, and the sound port 5 is formed in that over-extending side. The opening 3*c* is formed in one side wall of the lower case 3 on the same side as the sound port 5 is formed, and the lands 29 and 31 are exposed on the same side wall.

This invention is not limited to the above-described first to fourth embodiments, but may be embodied in many other specific forms without departing from the spirit or scope of the invention.

For example, the position of the opening 3*c* through which both coil terminals 9*a* and 9*b* of the coil 9 are to be led out and the positions of the lands 29 and 31 to which the coil terminals 9*a* and 9*b* are securely soldered are not particularly limited to the illustrated positions, but may be set arbitrarily.

The coil terminals may be connected to the associated lands by means of, for example, a conductive adhesive instead of soldering.

Although the first to fourth embodiments have been described as electromagnetic type electroacoustic transducers, this invention is also adaptable to other types of electroacoustic transducers, such as an electric conduction type and a piezo type.

What is claimed is:

1. An electroacoustic transducer comprising:

a lead frame formed into a predetermined shape;

an outer case integrated with said lead frame and having an opening;

a drive section including a coil arranged inside said outer case; and lands formed by exposing a part of said lead frame through an outer surface of said outer case, wherein said coil has coil terminals leading out of said outer case through said opening in said outer case and connected to said lands.

2. The electroacoustic transducer as claimed in claim 1, wherein said opening is formed in a bottom of said outer case and said lands are exposed on said bottom of said outer case.

3. The electroacoustic transducer as claimed in claim 1, wherein said opening is formed in a side wall of said outer case and said lands are exposed on said side wall of said outer case.

4. The electroacoustic transducer as claimed in claim 2, wherein said outer case has a groove portion and said opening is formed in said groove portion and said lands are aligned with said groove.

5. The electroacoustic transducer as claimed in claim 3, wherein said outer case has a groove portion and said opening is formed in said groove portion and said lands are aligned with said groove.

6. The electroacoustic transducer as claimed in claim 3, further comprising a plurality of external connection terminals formed by exposing a part of said lead frame on a side wall of said outer case, wherein said opening and said lands are located on the same side wall as said external connection terminals.

7. The electroacoustic transducer as claimed in claim 3, further comprising a plurality of external connection terminals formed by exposing a part of said lead frame on a side wall of said outer case, wherein said opening and said lands are located on a different side wall than said external connection terminals.

8. The electroacoustic transducer as claimed in any one of claims 1 to 7, wherein said electroacoustic transducer has an electromagnetic drive device.

9. The electroacoustic transducer as claimed in any one of claims 1 to 7, wherein said electroacoustic transducer has a piezo type drive device.

10. The electroacoustic transducer as claimed in claim 4, wherein said lead frame has a first bridge including a first bulge portion and a second bridge including a second bulge portion, wherein said first and second bulge portions are exposed through the outer surface of the outer case as said lands.

11. The electroacoustic transducer as claimed in claim 10, wherein said first bridge and first bulge portion are spaced from said second bridge and second bridge portion.

12. The electroacoustic transducer as claimed in claim 6, wherein said lead frame has a first bridge including a first bulge portion and a second bridge including a second bulge portion, wherein said first and second bulge portions are exposed through the outer surface of the outer case as said lands, and wherein areas to a left side and to a right side of said first and second bulge portions form said plurality of external connection terminals.

13. The electroacoustic transducer as claimed in claim 7, wherein said lead frame has a first bridge including a first bulge portion and a second bridge including a second bulge portion, wherein said first and second bulge portions are exposed through the outer surface of the outer case as said lands, and wherein areas to a left side and to a right side of said first and second bulge portions form said plurality of external connection terminals.

* * * * *